United States Patent
Alberti et al.

(10) Patent No.: US 7,385,803 B2
(45) Date of Patent: Jun. 10, 2008

(54) TETRAVALENT METAL ACID TRIPHOSPHATES

(75) Inventors: Giulio Alberti, Perugia (IT); Riccardo Vivani, Perugia (IT); Silvia Masci, Arrone (IT)

(73) Assignee: FuMA-Tech Gesellschaft für Funktionelle Membranen und Anlagentechnologie mbH, St. Ingbert / Saar (DE)

( * ) Notice: Subject to any disclaimer, the term of this patent is extended or adjusted under 35 U.S.C. 154(b) by 41 days.

(21) Appl. No.: 10/545,091

(22) PCT Filed: Feb. 18, 2004

(86) PCT No.: PCT/EP2004/001514

§ 371 (c)(1),
(2), (4) Date: Nov. 10, 2005

(87) PCT Pub. No.: WO2004/074179

PCT Pub. Date: Sep. 2, 2004

(65) Prior Publication Data

US 2006/0194702 A1 Aug. 31, 2006

(30) Foreign Application Priority Data

Feb. 19, 2003 (IT) ............... PG2003A0005

(51) Int. Cl.
- C01B 25/26 (2006.01)
- B01J 27/18 (2006.01)
- H01G 4/08 (2006.01)
- B01D 53/22 (2006.01)
- H01M 8/00 (2006.01)

(52) U.S. Cl. ............ 361/524; 96/4; 96/11; 96/12; 423/308; 423/309; 429/12; 502/208

(58) Field of Classification Search ........ 423/308, 423/309, 315; 96/4, 11, 12; 361/524; 429/12; 502/208
See application file for complete search history.

(56) References Cited

U.S. PATENT DOCUMENTS 3,416,884 A * 12/1968 Stynes et al. ............ 423/181

(Continued)

OTHER PUBLICATIONS

Baranov, A.I., et al., "Superion conductivity and phase transitions in $CsHSO_4$ and $CsHSeO_4$ crystals", *JEPT Lett.*, vol. 36, pp. 459-462, (1982), no month.

(Continued)

*Primary Examiner*—Wayne A. Langel
(74) *Attorney, Agent, or Firm*—Gary M. Nath; Tanya E. Harkins

(57) ABSTRACT

This invention is based on the preparation of new solid acid triphosphates with compositions of the general formula $M(IV)(HPO4)(H2PO4)2$, where M(IV) is a tetravalent metal or a mixture of tetravalent metals. These compounds are insoluble in water the greater part of most organic solvents. They show a high non-water assisted protonic conductivity (about 0.01-0.04 S/cm at 100° C. and a relative humidity lower than 1%). These compounds can be used as proton conduction separators in electrochemical devices, to operate at low relative humidity values, as for example in different fuel cells, protonic pumps for electrochemical hydrogenation and dehydrogenation of organic compounds, or for hydrogen production from hydrogenated organic compounds by electro-reforming, or also for removing hydrogen from equilibrium reactions. These compounds can also be used in electrochemical sensors, in super capacitors and as acid catalysts in non-aqueous or anhydrous gaseous phases.

26 Claims, 7 Drawing Sheets

U.S. PATENT DOCUMENTS

| | | | | |
|---|---|---|---|---|
| 4,609,484 | A | * | 9/1986 | Alberti et al. .............. 252/184 |
| 4,629,656 | A | * | 12/1986 | Alberti et al. ........... 428/411.1 |
| 4,826,663 | A | * | 5/1989 | Alberti et al. .............. 423/157 |
| 5,085,845 | A | * | 2/1992 | Ueda et al. ................. 423/308 |
| 5,892,080 | A | * | 4/1999 | Alberti et al. ................ 556/19 |
| 2003/0103888 | A1 | * | 6/2003 | Hai et al. ................... 423/308 |

OTHER PUBLICATIONS

Lassègues, J.C., et al., "Proton conducting polymer blends and hybrid organic inorganic materials", *Solid State Ionics*, vol. 145, pp. 37-45, (2001), no month.

Brodalla, D., et al., "A New Form of Al($H_3PO_4$)$_3$ with Three-Dimensional Al-O-P Crosslinking", *Z. Naturforsch.*, vol. 36b, pp. 907-909, (1981), no month.

Henn, F.E.G., et al., "Frequency Dependent Protonic Conduction in $N_2H_5Sn_3F_7$ Glass and RbHSeO$_4$ Single Crystal", *Solid State Ionics*, vol. 42, pp. 29-36, (1990), no month.

Schuster, M., et al., "Proton mobility in oligomer-bound proton solvents: imidazole immobilization via flexible spacers", *Solid State Ionics*, vol. 145, pp. 85-92, (2001), no month.

Jones, D.J., et al., "Recent advances in the functionalism of polybenzimidazole and polyetherketone for fuel cell applications", *Journal of Membrane Science*, vol. 185, pp. 41-58, (2001), no month.

Sholin, Y.I., et al., "Russian Title", *Kristallografiya KRSA*, vol. 27, pp. 239-241, (1981), no month.

Alberti G., et al., "Layered and pillared metal phosphates and phosphonates", *Advanced Materials*, vol. 8, No. 4, pp. 291-303, (Apr. 1, 1966) XP000587105.

Clearfield A., et al., "The preparation of crystalline zirconium phosphate and some observations on its ion exchange behaviour", *Journal of Inorganic & Nuclear Chemistry*, vol. 26, pp. 117-129, (1964) XP0009005533, no month.

Alberti G., et al., "Solid state protonic conductors, present main applications and future prospects", *Solid State Ionics*, vol. 145, No. 1-4, pp. 3-16 (Dec. 1, 2001) XP004310745.

Nagai Masayuki, et al., "Conductivity Dominating Factors In Three-Dimensional Zirconium Phosphate Ion Conductors" *Solid State Ionics* vol. 3/4, pp. 227-231, (Aug. 1980) XP002285249.

Liu Y, et al., "Hydrothermal Synthesis and Characterization of Two New Three-Dimensional Titanium Phosphates" , *Chemistry of Materials*, vol. 13, No. 6, pp. 2017-2022 (Jun. 2001) XP001086775.

\* cited by examiner

TETRAVALENT METAL ACID TRIPHOSPHATES

The invention relates to a metal acid phosphate composition of the general formula $M(IV)(HPO_4)(H_2PO_4)_2$, methods for preparation, use of the compositions and membranes and fuel cells comprising the composition.

The solid state protonic conduction phenomenon is of special interest, other than from a fundamental point of view, also for application in several electrochemical devices such as fuel cells for electric cars or other portable electric apparatus like cameras, computers, cellular phones and so on, protonic pumps, super capacitors for electric energy storage and so on.

The interest for hydrogen fuel cells has further grown up in the last years, following an increasing legislative control on atmospheric pollution in the most industrial countries.

Fuel cells use membranes possessing a high protonic conductivity and a good stability toward oxidation. Nowadays, preferred membranes are those based on sulphonated fluorocarbonic polymeric matrices, for example Nafion™, which is developed and marketed by DuPont de Nemours, or other perfluorinated acid membranes produced by the Dow Chemical Company, Solvay Solexis S.p.A. and Asahi Chemical Industry. These membranes generally have the required protonic conductivity and chemical stability. However, they are very expensive for application in mass products. Therefore, much effort has been done to develop protonic conduction membranes cheaper than the perfluorinated ones, such as those based on sulphonated polyether-ketones or polysulphones. Unfortunately these last membranes do not show the excellent characteristics of perfluorinated membranes. Furthermore, even when the economical aspects of these protonic conductors could be positively solved, the large scale diffusion of cars using hydrogen as fuel is expected to be slowed down by the problems related to the refuelling for this gaseous fuel, and by the real risks connected with the use of hydrogen. Market forecasts for hydrogen fuel cells to be used in portable electric devices are even more unfavourable. The use of liquid fuels, possibly with a low inflammability, should make more easy the refuelling of cars at the existing petrol pumps, and should reduce people wariness of this fuel. Therefore, Direct Methanol Fuel Cells (DMFCs), in which the cell is directly fed by a water solution of methanol, are currently investigated. Unfortunately, these cells have additional technological problems, since all commercial membranes, including Nafion, show a much too high permeability toward methanol. To solve this problem, current DMFCs must operate with very dilute methanol solutions (1-2 molar). Moreover, even if the permeability toward methanol could be largely reduced the use of more concentrated methanol solutions would be difficult likewise, because the consequent reduction of water would considerably decrease the protonic conductivity of the membranes. This is due because, in all sulphonated polymer-based membranes, the protonic transport mechanism is assisted by water.

In the literature there are reported structural studies of trivalent Al and Sc triphosphate $Al(H_2PO_4)_3$ and $Sc(H_2PO_4)_3$ (D. Brodalla et al., Z. Natur-forsch., 36b, 907, 1981; Y. I. Sholin et al., Kristallografiya KRSA 27, 239, 1982). However, protonic conductivity measurements performed by us have shown that these trivalent aluminium and scandium triphosphates do not possess any appreciable protonic conductivity, especially at a low relative humidity.

For as concern solid state protonic conductivity in anhydrous conditions literature reports some membranes with an alkaline polymeric matrix, for example those based on polybenzimidazole, that show an appreciable protonic conductivity when they are charged with an excess amount of sulphuric or phosphoric acid compared with the amount of polymer alkaline groups (J. C. Lassegues et al., Solid State Ionics, 145, 37, 2001; D. J. Jones and J. Roziere, J. Membr. Sci., 185, 41, 2001). Unfortunately, these membranes tend to leak a considerable amount of these acids by and by, since they are very soluble both in water and in many proton acceptor organic solvents. The recent compounds based on imidazole immobilized in an acidic polymeric matrix, described (M. F. H. Schuster et al., Solid State Ionics 145, 85, 2001) are more stable, but have a still low protonic conductivity of about 0.001 S/cm.

The literature also reports acid salts of large monovalent cations, such as $RbHSO_4$, $CsHSO_4$, and $CsH_2PO_4$, that show a non-water assisted protonic conductivity. These acid salts are known as "superprotonic phases" because they show a good conductivity (0.006-0.01 S/cm) only after a phase transition at 139° C. (A. I. Baranov et al., JEPT Lett. 36, 459, 1982; F. E. G. Henn et al., Solid State Ionics 42, 29, 1990).

The invention is based on the object of providing new protonic conductors possessing a low methanol permeability and an acceptable protonic conductivity even at low relative humidity values.

This object is achieved through the preparation of new protonic conductors based on tetravalent metal acid triphosphates with a protonic conductivity higher than that of the already known metal (IV) diphosphates with a layered structure, such as $\alpha\text{-}M(IV)(HPO_4)_2.H_2O$ and $\gamma\text{-}M(IV)(PO_4)(H_2PO_4).2H_2O$. New M(IV) acid triphosphates with a three-dimensional framework structure with composition $M(IV)(HPO_4)(H_2PO_4)_2$ were prepared and surprisingly these acid triphosphates have shown a very high protonic conductivity (about 0.03 S/cm at 100° C.) even at very low relative humidity values (<1%). These new M(IV) acid triphosphates have a non-water assisted protonic conduction mechanism different from previously known layered diphosphates, and different from all sulphonated polymeric membranes.

The object of the invention is achieved through a metal acid phosphate composition of the general formula $M(IV)(HPO_4)(H_2PO_4)_2$ where M is a tetravalent metal or a mixture of tetravalent metals. In the inventive metal acid phosphate composition the ratio of metal atoms to phosphorous atoms is 1:3. Until now there are just compositions known with a metal to phosphorous ratio of 1:2.

Preferably, the proton conductivity of the inventive composition is at least 0.001 S/cm and more preferably even more than 0.01 S/cm at surroundings, that are substantially free from water. The above protonic conductivity is performed at a relative humidity of below 1% at 100° C. In general, the conductivity of the inventive metal acid triphosphates is dependent not only on humidity but particularly on the temperature as well. In a preferred embodiment the composition shows a protonic conductivity of at least 0.001 S/cm even in totally dry surroundings.

In a preferred embodiment the metal is at least one metal of the fourth group of transition metals. Preferably, the metal is at least one of the group consisting of titanium, zirconium and hafnium. It is also possible, that the metal is a metal of the fourth main group, preferably tin and lead, in particular in combination with at least one of the transition metals, preferably titanium, zirconium and hafnium, especially with a content of up to 10% by weight of the metal of the fourth main group (0.5 to 10% by weight).

Preferably, the composition is insoluble in water at temperatures below 8° C. In case of titanium, the metal acid triphosphate composition is stable in water up to 27° C. Further, the metal acid triphosphate composition is preferably stable in common organic solvents, especially alcohols, carbon tetrachloride, dimethylformamide and benzene at temperatures below 110° C.

The composition can have a three-dimensional trigonal structure. Preferably the M(IV) atoms are octahedrally coordinated with six oxygen atoms of adjacent acid phosphate groups. In particular, the O—O distance between two adjacent phosphate groups is below 3.0 Å, preferably below 2.8 Å. It was found that in phosphates with an oxygen distance below 3.0 Å a proton conduction free from water, originating directly from the phosphate protons, occurs, involving solely the adjacent phosphate protons (see FIG. 5).

In one embodiment, the metal acid triphosphate composition, especially wherein M is hafnium, is stable in air up to about 110° C. or more at a water vapour partial pressure below 7 mm Hg. In another embodiment, wherein M is titanium and zirconium, the composition is stable up to approximately 100° C.

In one embodiment the density of the metal acid phosphate composition is in a range of 2 to 3.2 g/cm$^3$, preferably ca. 2.5 g/cm$^3$ in the case of zirconium, preferably ca. 2.45 g/cm$^3$ in the case of titanium and ca. 3.11 g/cm$^3$ in the case of hafnium.

In one embodiment the composition is proton-conductable in a polymer, that is non-proton conductable in a water-free state.

The M(IV) metal acid phosphate composition M(IV)(HPO$_4$)(H$_2$PO$_4$)$_2$ can be irreversible transferable into a M(IV) pyrophosphate M(IV)(P$_2$O$_7$) at temperatures above 110° C. Further, the composition can be reversible transferable to M(IV) phosphate M(IV)(HPO$_4$)$_2$ at high humidities.

In a preferred embodiment the composition has a microcrystalline structure. The crystal size of the composition can vary depending on the different possible metal atoms and can range below 20 μm, preferably below 5 μm. In a preferred embodiment the crystal size is 10 μm, wherein. M is zirconium and about 5 μm wherein M is titanium. In case of surrounding polymers having insufficient conductivity in a state free from water, a regular particle structure of the M(IV) triphosphate composition is preferred to give an acceptable conductivity of an M(IV) triphosphate containing polymer composite.

The metal acid phosphate composition can exist in many different forms, particularly in the form of single component materials as well as in the form of composite materials. In one embodiment the composition has the form of a thin film. In another embodiment the composition has the form of a composite membrane. Advantageously, the composition in form of a membrane or a thin film is impermeable to methanol. The impermeability to methanol is of great importance for the application of the membrane or the thin film in direct methanol fuel cells (DMFC), hydrogen fuel cells or reformate fuel cells respectively. In still another embodiment the composition has the form of a tablet. It is also possible that the metal acid triphosphate composition is embedded in a polymer, especially in a polymer membrane. Such polymer membranes comprising metal acid triphosphate compositions can be used for example in fuel cells, electrolysis cells and in general for proton separating purposes in the gaseous and liquid phase.

Another object of the invention is a method for preparation of metal acid triphosphate compositions of the general formula M(IV)(HPO$_4$)(H$_2$PO$_4$)$_2$ wherein M is a tetravalent metal or a mixture of tetravalent metals comprising the steps of treating a metal M(IV) containing material in phosphoric acid of at least 85% by weight, preferably in anhydrous phosphoric acid. The preferred phosphoric acid is orthophosphoric acid with a melting point of 42° C. which is at least 14 molar. The phosphoric acid can either be a melted phosphoric acid or an anhydrous solution of phosphoric acid in an anhydrous organic or inorganic solvent. Further, the material is incubated at a higher temperature in the range of 70 to 100° C. followed by separating a M(IV)(HPO$_4$)(H$_2$PO$_4$)$_2$ containing material and the phosphoric acid. Separation of the material and the phosphoric acid in form of an anhydrous solution or a melt can be carried out for example by centrifugation, filtration or by draining the phosphoric acid. Afterwards, the M(IV)(HPO$_4$)(H$_2$PO$_4$)$_2$ containing material optionally is washed with an organic solvent that is able to dissolve phosphoric acid. Preferably, acetone or isopropanol is used for washing. Finally, it is possible to dry the M(IV)(HPO$_4$)(H$_2$PO$_4$)$_2$ containing material at temperatures below decomposition temperature of the M(IV)(HPO$_4$)(H$_2$PO$_4$)$_2$ composition. Therefore, temperatures below 100° C. are preferred for titanium and zirconium whereas for hafnium the maximum temperature for drying is about 110° C. Advantageously, a temperature in range from 50 to 60° C. is applied for drying the M(IV)(HPO$_4$)(H$_2$PO$_4$)$_2$ containing material.

In a preferred embodiment of the method of the invention for preparation of a M(IV)(HPO$_4$)(H$_2$PO$_4$)$_2$ containing material the metal M(IV) containing material is a metal M(IV) containing compound. In case or a metal M(IV) containing compound the method for preparation comprises the following steps: at first the metal M(IV) containing compound is dispersed in phosphoric acid of at least 85%, preferably anhydrous, particularly melted, phosphoric acid, followed by stirring the mixture at a temperature of 70 to 100° C. for some hours to 5 days. Preferably, the mixture is stirred for 1 to 3 days followed by separating a preferably crystalline solid of M(IV)(HPO$_4$)(H$_2$PO$_4$)$_2$ from the melt or solution of phosphoric acid. Optionally it follows a washing of the preferably crystalline solid M(IV)(HPO$_4$)(H$_2$PO$_4$)$_2$ with an organic solvent able to dissolve phosphoric acid, preferably acetone or isopropanol. Advantageously the preferably crystalline solid M(IV)(HPO$_4$)(H$_2$PO$_4$)$_2$ is dried afterwards at a temperature below the decomposition temperature of the metal acid triphosphate M(IV)(HPO$_4$)(H$_2$PO$_4$)$_2$.

In another embodiment of the method according to the invention, the metal M(IV) containing material is a composite membrane containing a metal M(IV) compound. Preferably the M(IV) compound is at least one of the group of M(IV) propionate, M(IV) phosphate, M(IV) phosphonate. Preferably, the method according to the invention comprises treating a phosphoric acid stable membrane containing a metal M(IV) compound in phosphoric acid of at least 85%, preferably anhydrous, particularly melted, phosphoric acid, followed by incubating the membrane at temperatures of 70 to 100° C. for 1 to 10, preferably 4 to 7 days. Finally, the membrane containing M(IV)(HPO$_4$)(H$_2$PO$_4$)$_2$ can be separated from the melt or solution of phosphoric acid. Optionally, after separation, washing of the membrane containing M(IV)(HPO$_4$)(H$_2$PO$_4$)$_2$ with an organic solvent able to dissolve phosphoric acid, preferably acetone or isopropanol, follows. Advantageously, the membrane containing M(IV)(HPO$_4$)(H$_2$PO$_4$)$_2$ is dried afterwards at a temperature below the decomposition temperature of the metal acid triphosphate M(IV)(HPO$_4$)(H$_2$PO$_4$)$_2$.

In a preferred embodiment of the method the metal M(IV) containing compound is at least one selected from the group of M(IV) metal powder or cuttings, dehydrated M(IV)

phosphate of the formula $M(IV)(HPO_4)_2$, dehydrated $M(IV)$ phosphonate, dehydrated $M(IV)$ oxychloride and dehydrated $M(IV)$ propionate. More preferably, titanium powder, zirconium oxychloride. ($ZrOCl_2$), hafnium oxychloride, zirconium propionate and layered or amorphous zirconium phosphate ($Zr(HPO_4)_2$).

Favourably, the anhydrous phosphoric acid is a solution of phosphoric acid prepared by dissolving anhydrous phosphoric acid in an anhydrous organic solvent. Preferably, anhydrous phosphoric acid is dissolved in anhydrous isopropanol.

The invention also includes a composite membrane made of at least one organic polymer and at least one of a tetravalent metal acid triphosphate $M(IV)(HPO_4)(H_2PO_4)_2$. It is possible that the composite membrane comprises a single organic polymer as well as a composite membrane comprising several organic polymers to achieve certain characteristics of the membrane material.

The invention further involves a composite membrane made of a porous membrane wherein pores are filled with at least one of a tetravalent metal acid phosphate of the general formula $M(IV)(HPO_4)(H_2PO_4)_2$ wherein M is a tetravalent metal or a mixture of tetravalent metals. In one embodiment the membrane is an inorganic, preferably ceramic, membrane whereas in another embodiment of the invention the membrane is a polymeric porous membrane. It is possible to fill the porous membrane directly with a metal acid triphosphate composition to obtain the composite membrane. Further on, the pores in the porous membrane can be filled initially with layered or amorphous phosphate, especially with zircon phosphate ($Zr(HPO_4)_2$), or alternatively with metal M(IV) followed by conversion of the metal or metal compound into the metal acid triphosphate composition according to the invention. The size of the particles within the pores of the porous membrane can vary from 1 to 10 µm. The zircon containing compound $Zr(HPO_4)(H_2PO_4)_2$ preferably have a particle size of 2 to 10 µm whereas the size of titanium containing compound $Ti(HPO_4)(H_2PO_4)_2$ is ca. 1 µm.

The invention also includes a membrane for a protonic conduction separator containing at least one of the tetravalent metal acid triphosphates according to the invention. In a preferred embodiment the protonic conduction separator membrane is a fuel cell membrane.

In a preferred embodiment the membranes according to the invention comprise a reinforcing element in form of supporting fabrics or supporting membranes. These supporting elements can be made of fabrics, preferably of glass or of polymers.

The invention further comprises a thin layer that contains, preferably consists of, at least one preferably crystallized tetravalent metal acid triphosphate according to the invention.

In one embodiment the metal acid triphosphate composition $M(IV)(HPO_4)(H_2PO_4)_2$ can be compression-molded to a thin layer or pellet.

The invention further comprises a catalyst powder containing at least one of the tetravalent metal acid triphosphates according to the invention. The catalyst powder can be either heterogeneous or homogeneous and can be used for hydrogenation, for acid catalysis and/or for esterification.

Another subject of the invention is a super capacitor with two conductors separated by a dielectric, wherein the dielectric contains and preferably consists of at least one of the tetravalent metal acid triphosphates according to the invention. The super capacitor can be formed from a thin film or a pellet of the metal acid triphosphate.

Still another subject of the invention is a fuel cell containing at least two particularly porous electrodes and a proton conducting thin layer comprising at least one of the tetravalent metal acid triphosphates according to the invention. Preferably, the fuel cell is one of the group consisting of direct methanol fuel cells (DMFC), hydrogen fuel cells (PEMFC) and reformate fuel cells. Reformate fuel cells use hydrogen that is in situ generated from biogas, natural gas, methane, propane, alcohols or from oil.

The invention comprises a fuel cell containing at least two electrodes and a proton conducting membrane according to the invention. Preferably, the fuel cell containing a proton conducting membrane is one of the group consisting of direct methanol fuel cells, hydrogen fuel cells and reformate fuel cells.

Another subject of the invention is a protonic pump with anode, cathode and a proton conductive separator containing at least one of a tetravalent metal acid triphosphate according to the invention.

An object of this invention is also the use of the metal acid triphosphate composition according to the invention for preparation of composite membranes containing organic polymers and the metal acid triphosphate composition.

Another object of this invention is the use of the metal acid triphosphate composition according to the invention for filling pores of porous membranes. The membranes can be inorganic, preferably ceramic, or polymeric membranes.

Another object of this invention is the use of the membranes according to the invention as a protonic conduction separator, preferably in fuel cells, particularly in direct methanol fuel cells (DMFC), hydrogen fuel cells (PEMFC) and reformate fuel cells. The membranes according to the invention can also be used in other types of fuel cells. Further on, the membranes according to the invention can also be used as a protonic conduction separator in electrochemical sensors.

Still another object of the invention is the use of the metal acid triphosphate composition according to the invention for preparation of an isolator of super capacitors. Therefore, the composition can be used as a pure thin film or as a pellet.

An object of the invention is also the use of the metal acid triphosphate composition according to the invention as a heterogeneous catalyst, preferably for anhydrous gas phase reaction, particularly for acid catalysis, hydrogenation or esterification reactions. Preferably, the composition is used in form of a powder as a heterogeneous or homogeneous catalyst.

Another object of the invention is the use of the metal acid triphosphate composition according to the invention as a thin layer on porous electrodes in a fuel cell, preferably in a direct methanol fuel cell, hydrogen fuel cell or reformate fuel cell. Further on, it is possible to use the composition in other types of fuel cells.

An object of the invention is the use of the membranes according to the invention in a fuel cell.

Another object of this invention is the use of the tetravalent metal acid triphosphates according to the invention in a protonic pump for the production or removal of gaseous hydrogen and for the electrochemical compression of hydrogen.

It should be pointed out that protonic conduction membranes with these characteristics could induce the development of new protonic pumps able to operate with anhydrous gas or in non aqueous liquid environments. Hydrogen production from hydrogenated organic compounds by electrocatalytical deprotonation processes on these membranes could be also possible. Materials showing a high protonic conductivity also in non aqueous environments should find application also in acid catalysis and electro catalysis in organic solvents and in electrochemical sensors.

Compounds with this composition and properties can be obtained with tetravalent metals of the group consisting of zirconium, titanium and hafnium. Therefore, these new tetravalent metal acid triphosphates with a high non-water assisted protonic conductivity can be described by the general formula $M(IV)(HPO_4)(H_2PO_4)_2$, where M(IV) is a tetravalent metal or a mixture of tetravalent metals.

To highlight oxygen atoms coordinated to the central tetravalent metal atom, the protonic conductors that are the object of this patent are formulated as $M(IV)(O_2PO(OH))(O_2P(OH)_2)_2$, where the oxygen atoms coordinated to the central metal atom are put on the left of the phosphorus atom.

It is assumed that this peculiar non-water assisted conductivity arises from the presence of $(O_2P(OH)_2)$ and $(O_2PO(OH))$ groups at the same time. $(O_2PO(OH))$ groups bear proton acceptor oxygen atoms, and play an important role for the non-water assisted protonic conductivity. This fact should also explain why trivalent aluminium and scandium phosphates do not show a high protonic conductivity, even if they have similar structure and composition.

The compounds object of this patent are the solids possessing the highest protonic conductivity in the absence of water in the temperature range from 0 to 110° C. Furthermore, different from the above acid salts of large monovalent cations, tetravalent metal acid triphosphates are very insoluble in water and in the most common organic solvents. This can prevent their dissolution when used in these liquids. Furthermore tetravalent metal acid triphosphate crystals are totally impermeable to methanol, thanks to their compact three-dimensional structure.

One object of this invention is the preparation of tetravalent metal acid triphosphates with a three-dimensional structure, with composition $M(IV)(O_2PO(OH))(O_2P(OH)_2)_2$, which are insoluble in water and/or in the most common organic solvents, which show a non-water assisted protonic conduction mechanism with a protonic conductivity not lower than 0.001 S/cm, and preferably more than 0.01 S/cm, at 100° C. and relative humidity <1%.

Another object of this invention is the use of the above compounds as catalysts in heterogeneous acid catalysis in organic solvents or in anhydrous gaseous environments.

Another object of this invention is the use of the above compounds in the form of thin films, pellets or composite membranes.

An object of this invention is also the use of the above thin films and composite membranes as protonic conduction separators in fuel cells, in particular, in direct methanol fuel cells.

An object of this invention is also the use of the above thin films and composite membranes in electrochemical devices in which they are placed, as protonic conduction separators, between two porous catalytic electrodes, An object of this invention is also the use of the above thin films and composite membranes in protonic pumps operating under anhydrous conditions to make hydrogenation or de-hydrogenation reactions of organic compounds, to eliminate gaseous hydrogen formed in equilibrium reactions or for hydrogen production from methanol or other hydrogenated organic compounds, by the application of an electric field between the two catalytic electrodes, An object of this invention is also the use of the above thin films and composite membranes in electrochemical sensors to be used in anhydrous gaseous environments or organic liquids.

The independent and dependent Patent Claims are hereby incorporated into the Description by way of reference.

Further features of the invention are apparent from the following description of preferred embodiments and examples. The individual features of the invention here may be realized alone or in combination with one another. The embodiments described serve for illustration and to improve understanding of the invention, and are in no way to be understood as limiting.

EXAMPLES

Example 1

This example illustrates one method for the preparation of zirconium acid triphosphate $Zr(HPO_4)(H_2PO_4)_2$ and reports some characteristics of this compound.

Zirconium oxychloride octahydrate, $ZrOCl_2.8H_2O$, is accurately dehydrated in an oven at 110° C. for about 1 h.

A weighed amount of anhydrous phosphoric acid (ortho-phosphoric acid, 99%, p.a., Fluka), corresponding to 3 moles of this acid, is melted at a temperature between 70 and 90° C. A weighed amount of anhydrous zirconium oxychloride, corresponding to 0.1 moles of zirconium, is dispersed in this melt. This procedure has to be carried out with care under a hood, because the formation of gaseous hydrochloric acid is observed. After a few minutes zirconium oxychloride is completely dissolved in the melted phosphoric acid. The melt is left at the above temperature for about 48 h, preferably under stirring. During this time, a white micro-crystalline solid precipitates. The solid is separated from the melt (for example by centrifugation or filtration) and is then washed with an anhydrous organic solvent, that is able to dissolve phosphoric acid, for example, acetone or iso-propanol.

The recovered solid has a density equal to 2.5 g/cm³ and a composition corresponding to the formula $Zr(HPO_4)(H_2PO_4)_2$. This solid shows a good X-ray powder diffraction pattern (see FIG. 1), the values (in Å) of the five more intense reflections of which are (in order of decreasing relative intensity, reported in parentheses): 6.25 (1); 3.72 (0.8); 4.77 (0.65); 2.97 (0.55); 3.45 (0.32). Structural studies have shown that the solid has a three-dimensional framework structure and that zirconium atoms are octahedrally coordinated.

This compound is insoluble in water but it was found to be stable only at temperatures below 8° C. In air, it was stable up to 100° C. but only at a water pressures below 7 mmHg, while at water pressures higher than 7 mmHg, it converts into $\alpha$-$Zr(HPO_4)_2$. At temperatures higher than about 110° C. it converts into cubic zirconium pyrophosphate.

This compound is stable in common anhydrous organic solvents, such as alkanols, carbon tetrachloride, and benzene. In water/methanol mixtures, stability temperature ranges between 10 and 110° C., depending on methanol molar fraction.

The protonic conductivity of this compound has been determined in a cell that allows the measurement at different temperatures and relative humidity values. This cell was previously described in G. Alberti et al., J. Membr. Sci. 185, 75-81, 2001. Conductivity values, determined at 80, 90 and 100° C. and with a relative humidity lower than 1% are 0.02; 0.024 and 0.03 S/cm, respectively.

Example 1bis

This example is a change of example 1, and specifically the amount of zirconium oxychloride is replaced by an equivalent amount of anhydrous zirconyl propionate. In this case, evolution of gas is not observed because propionic acid remains dissolved in the melted phosphoric acid. For all the rest the procedure is analogous to that of example 1, and similar results are obtained.

Example 1tris

This example is a change of the method for the preparation of zirconium acid triphosphate, $Zr(HPO_4)(H_2PO_4)_2$, which is illustrated in examples 1 and 1bis, and specifically, layered $\alpha$-$Zr(HPO_4)_2 \cdot H_2O$ is used as zirconium source. A weighed amount of this last compound, corresponding to 0.1 moles, is previously dehydrated at 110° C. for 1 h, and then added to 1 mol of melted phosphoric acid at 85° C. X-ray diffraction patterns show that a slow conversion from the layered compound to the three-dimensional compound occurs, until full conversion (in about 4 days).

TABLE 1

Crystal data and refinement details for $Zr(HPO_4)(H_2PO_4)_2$

| | |
|---|---|
| Formula | $Zr(HPO_4)(H_2PO_4)_2$ |
| Formula weight | 381.2 |
| Crystal system | trigonal |
| Space group | R-3c |
| a(Å) | 8.27325(3) |
| b(Å) | 8.27325(3) |
| c(Å) | 25.5433(2) |
| $\alpha$(°) | 90 |
| $\beta$(°) | 90 |
| $\gamma$(°) | 120 |
| V(Å$^3$) | 1514.12(1) |
| Z | 6 |
| $d_{calc}$(g/cm$^3$) | 2.51 |
| Pattern range, 2$\theta$(°) | 20-139 |
| No. of data | 5949 |
| No of reflections | 299 |
| No. of refined parameters | 36 |
| $R_p$ | 0.084 |
| $R_{wp}$ | 0.110 |
| $R_F2$ | 0.103 |
| $\chi$ | 2.60 |

TABLE 2

Fractional atomic coordinates and isotropic displacement parameters for $Zr(HPO_4)(H_2PO_4)_2$

| Atom | x/a | y/b | z/c | Uiso × 100 |
|---|---|---|---|---|
| Zr(1) | 0 | 0 | 0 | 1.46(2) |
| P(2) | 0.6686(3) | 0 | 0.25 | 3.71(5) |
| O(3) | 0.5131(4) | −0.1099(4) | 0.2123(1) | 3.1(1) |
| O(4) | 0.7199(6) | −0.1237(5) | 0.2819(1) | 7.5(2) |

TABLE 3

Selected bond lengths and angles for $Zr(HPO_4)(H_2PO_4)_2$

| bond | length(Å) | Angle | Amplitude(°) |
|---|---|---|---|
| Zr(1)—O(3) | 2.059(3) | O(3)—Zr(1)—O(3) | 91.1(1) |
| P(2)—O(3) | 1.496(3) | O(3)—Zr(1)—O(3) | 180 |
| P(2)—O(4) | 1.525(4) | O(3)—Zr(1)—O(3) | 88.9(1) |
| O(4)---O(4) (intra phosphate) | 2.408(7) | O(3)—P(2)—O(3) | 112.5(3) |
| O(4)---O(4) (inter phosphate) | 2.770(7) | O(3)—P(2)—O(4) | 112.3(2) |
| O(4)---O(4) (inter phosphate) | 2.750(7) | O(3)—P(2)—O(4) | 107.7(2) |
| | | O(4)—P(2)—O(4) | 104.2(3) |
| | | Zr(1)—O(3)—P(2) | 157.8(2) |

Example 2

This example illustrates a method for the preparation of titanium acid triphosphate, $Ti(HPO_4)(H_2PO_4)_2$, and reports same characteristics of this compound.

A weighed amount of powdered metallic titanium (Aldrich, grain size lower than 27 mesh), corresponding to 0.1 moles of titanium is dispersed into about 1.3 moles of melted anhydrous phosphoric acid at a temperature of 85° C. Metallic titanium is completely dissolved after about 1 h, giving a blue-violet clear solution. After some hours a violet compound starts to precipitate, and, in the presence of air, a white product with composition $Ti(HPO_4)(H_2PO_4)_2$ is obtained. The product is separated and washed according to example 1.

The recovered solid has a density equal to 2.45 g/cm$^3$. This solid shows a good X-ray powder diffraction pattern, the values (in Å) of the five more intense reflections of which are (in order of decreasing relative intensity, reported in parentheses): 3.59 (1); 6.04 (0.7); 2.88 (0.4); 4.63 (0.3); 3.02 (0.3). Structural studies have shown that this solid is isostructural to that of the corresponding zirconium compound.

Titanium acid triphosphate was found to be stable at air at temperatures lower than about 100° C. and at water pressures lower than 27 mmHg. It is insoluble and stable in methanol, other alkanols and common organic solvents, such as carbon tetrachloride, dimethylformamide, benzene, etc. at temperatures lower than 110° C. In pure water this compound is stable at temperatures lower than about 27 to 28° C. In water/methanol mixtures its stability grows up from 27 to 100° C., as the molar fraction of methanol in the mixture increases. At temperatures higher than about 110° C., condensation of phosphate to pyrophosphate groups occurs, while at water pressures higher than about 27 to 30 mmHg, the conversion into the layered $\alpha$-$Ti(HPO_4)_2 \cdot H_2O$ is observed.

Protonic conductivity, determined with the cell mentioned in example 1 at temperatures of 90, 100, and 108° C. and at relative humidity lower than 1%, was 0.01, 0.012, and 0.014 S/cm, respectively.

Example 2bis

This example is a change of the method for the preparation of titanium acid triphosphate, which is illustrated in example 2, and specifically the reaction liquid, represented by the melted phosphoric acid, is replaced by a solution of anhydrous phosphoric acid in anhydrous iso-propanol (3 moles of iso-propanol per mol of phosphoric acid). For all the rest, the procedure is analogous to that of example 2, and similar results are obtained.

TABLE 4

Crystal data and refinement details for $Ti(HPO_4)(H_2PO_4)_2$

| | |
|---|---|
| Formula | $Ti(HPO_4)(H_2PO_4)_2$ |
| Formula weight | 337.88 |
| Crystal system | trigonal |
| space group | R-3c |
| a(Å) | 7.97139(6) |
| b(Å) | 7.97139(6) |
| c(Å) | 24.9618(3) |
| $\alpha$(°) | 90 |
| $\beta$(°) | 90 |
| $\gamma$(°) | 120 |
| V(Å$^3$) | 1373.64(2) |
| Z | 6 |

TABLE 4-continued

Crystal data and refinement details for Ti(HPO$_4$)(H$_2$PO$_4$)$_2$

| | |
|---|---|
| d$_{calc}$(g/cm$^3$) | 2.45 |
| Pattern range, 2θ(°) | 12-138 |
| No. of data | 6300 |
| No. of reflections | 298 |
| No. of refined parameters | 36 |
| R$_p$ | 0.091 |
| R$_{wp}$ | 0.124 |
| R$_F$2 | 0.091 |
| χ | 3.33 |

TABLE 5

Fractional atomic coordinates and isotropic displacement parameters for Ti(HPO$_4$)(H$_2$PO$_4$)$_2$

| Atom | x/a(Å) | y/b(Å) | z/c(Å) | Uiso · 100 |
|---|---|---|---|---|
| Ti(1) | 0 | 0 | 0 | 1.71(5) |
| P(2) | 0.6521(2) | 0 | 0.25 | 2.99(4) |
| O(3) | 0.1590(3) | 0.2221(3) | 0.54478(8) | 1.62(8) |
| O(4) | 0.5016(4) | 0.4672(4) | 0.5509(1) | 5.6(1) |

TABLE 6

Selected bond lengths and angles for Ti(HPO$_4$)(H$_2$PO$_4$)$_2$

| bond | Length(Å) | Angle | Amplitude(°) |
|---|---|---|---|
| Tl(1)—O(3) | 1.935(2) | O(3)—Tl(1)—O(3) | 89.98(9) |
| P(2)—O(3) | 1.485(2) | O(3)—Tl(1)—O(3) | 180 |
| P(2)—O(4) | 1.538(3) | O(3)—Tl(1)—O(3) | 90.02(9) |
| O(4)---O(4) (intra phosphate) | 2.459(5) | O(3)—P(2)—O(3) | 112.1(2) |
| O(4)---O(4) (inter phosphate) | 2.797(4) | O(3)—P(2)—O(4) | 107.8(1) |
| O(4)---O(4) (inter phosphate) | 2.595(5) | O(3)—P(2)—O(4) | 111.5(1) |
| | | O(4)—P(2)—O(4) | 106.1(2) |
| | | Tl(1)—O(3)—P(2) | 153.5(2) |

Example 3

This example illustrates a method for the preparation of hafnium acid triphosphate, Hf(HPO$_4$)(H$_2$PO$_4$)$_2$, and reports same characteristics of this compound.

Hafnium oxychloride octahydrate, (HfOCl$_2$.8H$_2$O, 98%, STREM CHEMICALS), is dehydrated in an oven at 110° C. for about 1 h.

A weighed amount of anhydrous phosphoric acid (Orthophosphoric acid, 99%, p.a., FLUKA), corresponding to 1.5 moles of this acid, is melted at 85 to 90° C. A weighed amount of anhydrous hafnium oxychloride, corresponding to 0.1 moles of hafnium is dispersed under stirring in this melt. This procedure has to be carried out under a hood, as formation of gaseous hydrochloric acid is observed. The melt is left, preferably under stirring, for 3 to 4 days.

During this time, a white microcrystalline solid precipitates. The solid is separated from the melt (for example by centrifugation or filtration) and is then washed with an anhydrous organic solvent (e.g. acetone or isopropanol).

The recovered solid has density equal to 3.11 g/cm$^3$ and a composition corresponding to the formula Hf(HPO$_4$)(H$_2$PO$_4$)$_2$. Its X-ray power diffraction pattern is shown in FIG. 6.

Structural studies have shown that the solid has a three-dimensional framework structure similar to that of Zr(HPO$_4$)(H$_2$PO$_4$)$_2$.

Protonic conductivity, determined with the cell mentioned in example 1 at temperatures of 80, 90, and 100° C. and at relative humidity lower than 1%, was 0.017, 0.02, and 0.024 S/cm, respectively.

Example 3bis

In contrast to zirconium acid phosphate, Hf(HPO$_4$)(H$_2$PO$_4$)$_2$ is less sensitive to the presence of water. Therefore, this compound can also be prepared by using a solution of phosphoric acid 85% and/or HfOCl$_2$.8H$_2$O. A P/Hf molar ratio similar to that of example 2, and similar procedure of preparation were used.

TABLE 7

Crystal data and refinement details for Hf(HPO$_4$)(H$_2$PO$_4$)$_2$

| | |
|---|---|
| Formula | Hf(HPO$_4$)(H$_2$PO$_4$)$_2$ |
| Formula weight | 468.5 |
| Crystal System | Trigonal |
| Space Group | R-3c |
| a(Å) | 8.24968(3) |
| c(Å) | 25.4927(2) |
| V(Å$^3$) | 1502.52(1) |
| Z | 6 |
| d$_{calc}$(g/cm$^3$) | 3.11 |
| Pattern range, 2θ(°) | 16.5-139.4 |
| No. of data | 6144 |
| No. of reflections | 635 |
| No of refined parameters | 43 |
| R$_p$ | 0.077 |
| R$_{wp}$ | 0.100 |
| R$_F$2 | 0.100 |
| χ | 2.91 |

TABLE 8

Atomic parameters and isotropic displacement factors for Hf(HPO$_4$)(H$_2$PO$_4$)$_2$

| Name | x/a | y/b | z/c | 100 Uiso |
|---|---|---|---|---|
| Hf1 | 0 | 0 | 0 | 2.04(2) |
| P2 | 0.6662(5) | 0 | 0.25 | 4.29(9) |
| O3 | 0.4990(7) | −0.1188(6) | 0.2127(2) | 3.6(2) |
| O4 | 0.7199(8) | −0.1237(9) | 0.2867(3) | 8.4(2) |

TABLE 9

Selected bond distances and angles for Hf(HPO$_4$)(H$_2$PO$_4$)$_2$

| Bond | Length(Å) | Angle | Amplitude(°) |
|---|---|---|---|
| Hf1—O3 | 1.989(5) | O3—Hf1—O3 | 88.8(2) |
| P2—O3 | 1.555(5) | O3—Hf1—O3 | 180 |
| P2—O4 | 1.602(6) | O3—Hf1—O3 | 91.2(2) |
| O4---O4 (inter phosphate) | 2.92(1) | O3—P2—O3 | 110.2(4) |
| O4---O4 (inter phosphate) | 2.51(1) | O3—P2—O4 | 113.4(3) |
| | | O3—P2—O4 | 106.5(3) |
| | | O4—P2—O4 | 107.0(4) |
| | | Hf1—O3—P2 | 156.9(3) |

Example 4

Preparation of a composite membrane material made of Poly-2,2'-(m-phenylen)-5,5'-dibenzimidazole (PBI)/Zr(HPO$_4$)(H$_2$PO$_4$)$_2$ by treatment of an α-zirconium phosphate containing composite membrane with melted ortho-phosphoric acid at 80° C.

a) A 9% colloidal dispersion of an α-zirconium phosphate in dimethylformamide is prepared according to PCT/EP 03/02550 (Example 1a).

b) High molecular weight Poly-2,2'-(m-phenylen)-5,5'-dibenzimidazole is prepared by extraction of commercial Polybenzimidazole Type Celazole® with dimethylformamide at 140° C. The resulting polymer should have an inherent viscosity of higher than 1.00 dl/g measured 0.5% H$_2$SO$_4$ at 30° C. The residue is dissolved in dimethylacetamide at 240° C. resulting 9% solution using an autoclave.

c) 25 g of a 9% solution of poly-2,2'(m-phenylen)-5,5'-dibenzimidazole in dimethylacetamide and 30 g of a 9% colloidal dispersion of an α-zirconium phosphate in dimethylformamide are mixed under vigorous stirring. The mixture is cast on a glass plate by means of an Erichsen semi automatic film casting processor. The solvent is removed by heating 30 minutes at 110° C. and 5 hours at 140° C. The membrane thus obtained after delamination (thickness 30 μm) is slightly brownish.

d) The dry membrane is put into a reaction vessel containing melted ortho phosphoric acid at 80° C. The full conversion into Zr(HPO$_4$)(H$_2$PO$_4$)$_2$ takes place within 7 days. The treated membrane is washed with acetone for complete removal of phosphoric acid.

Example 5

Preparation of a composite membrane material made of Poly-2,5-benzimidazol (ABPBI)/Zr(HPO$_4$)(H$_2$PO$_4$)$_2$ by treatment of a zirconyl propionate containing composite membrane with melted ortho-phosphoric acid at 80° C.

a) High molecular weight poly-2,5-benzimidazole is prepared during 2 hours at 80° C. and 6 hours at 140° C. from 3.4-diaminobenzoic acid in Eaton's reagent according to literature. The purified and powdered polymer should have an inherent viscosity of higher than 5.00 dl/g measured in 0,2% H$_2$SO$_4$ at 30° C.

b) A 7% solution of ABPBI and 0,5% LiCl in N-Methylpyrrolidone is prepared at 260° C. with vigorous stirring, cooled down to 110° C. and filtered. 15 g of zirconyl propionate are dissolved in 100 g of the solution. The mixture is cast on a glass plate by means of an Erichsen semi automatic film casting processor. The solvent is removed by heating 1 hour at 120° C. and 5 hours at 130° C. The membrane thus obtained after delamination (thickness 20 μm) is dark brown.

c) The dry membrane is put into a reaction vessel containing melted ortho phosphoric acid at 80° C. The full conversion into Zr(HPO$_4$)(H$_2$PO$_4$)$_2$ takes place within 7 days. The treated membrane is washed with acetone for complete removal of phosphoric acid.

FIGURES

Figure 1:
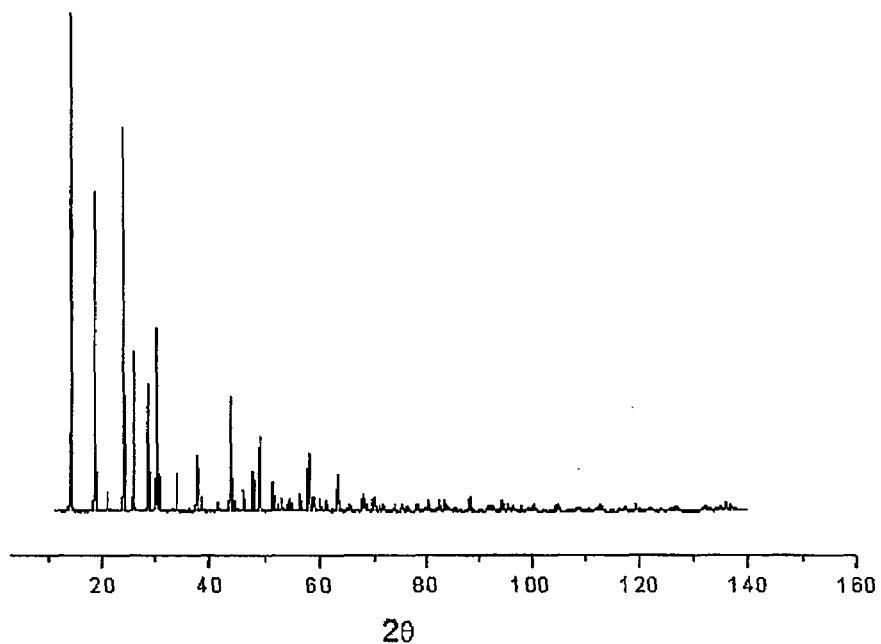
FIG. 1 shows an X-ray powder pattern of Zr(HPO$_4$)(H$_2$PO$_4$)$_2$
Figure 2:
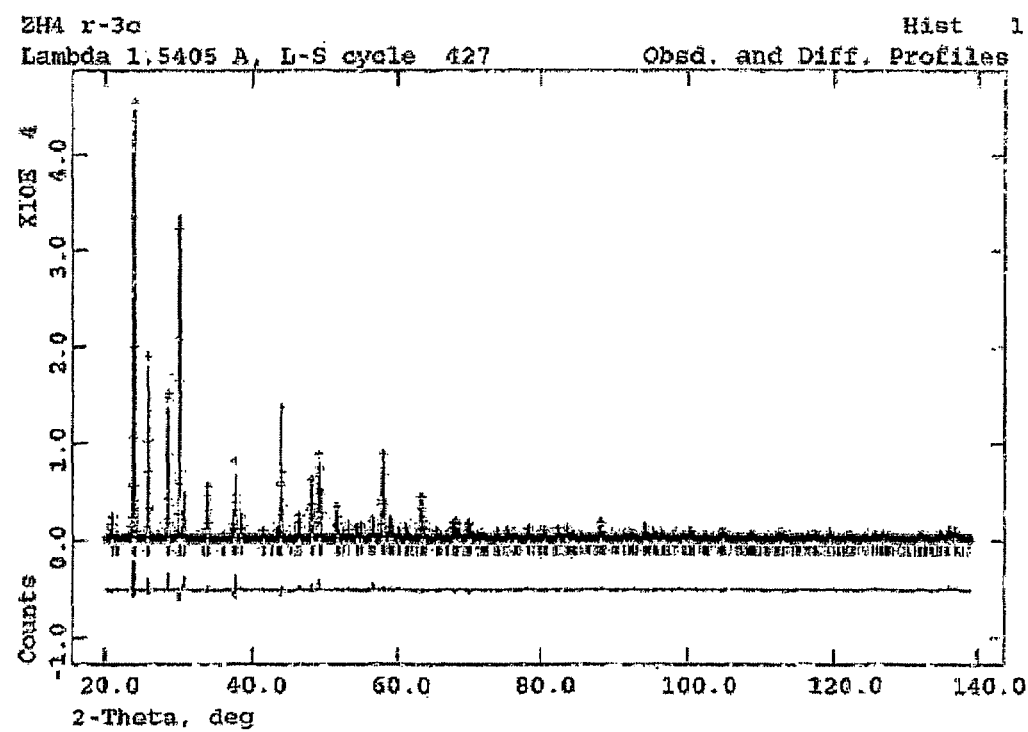
FIG. 2 shows a Rietveld plot for Zr(HPO$_4$)(H$_2$PO$_4$)$_2$
Figure 3:
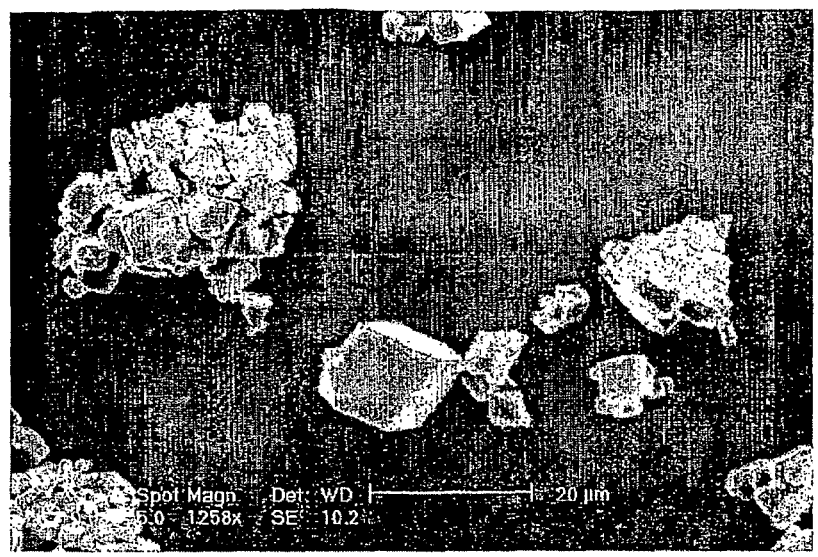
FIG. 3 shows a SEM picture of Zr(HPO$_4$)(H$_2$PO$_4$)$_2$ micro crystals.
Figure 4:
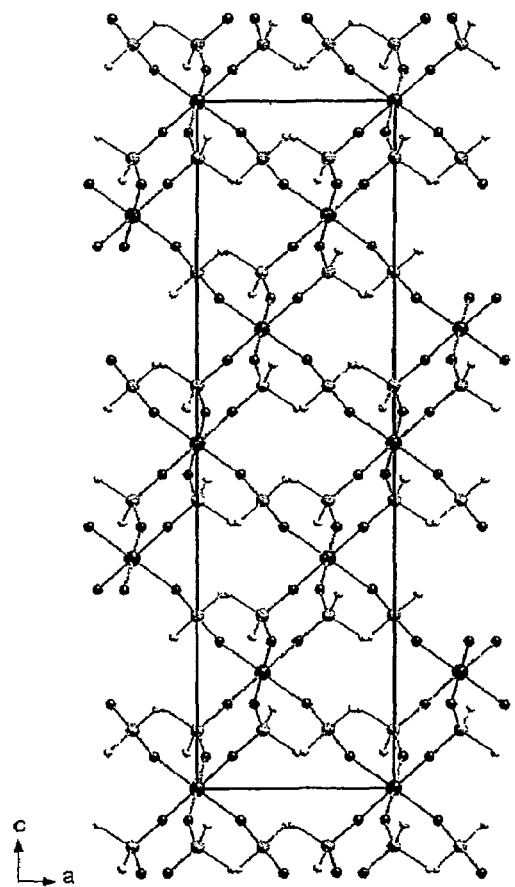
Figure 5:
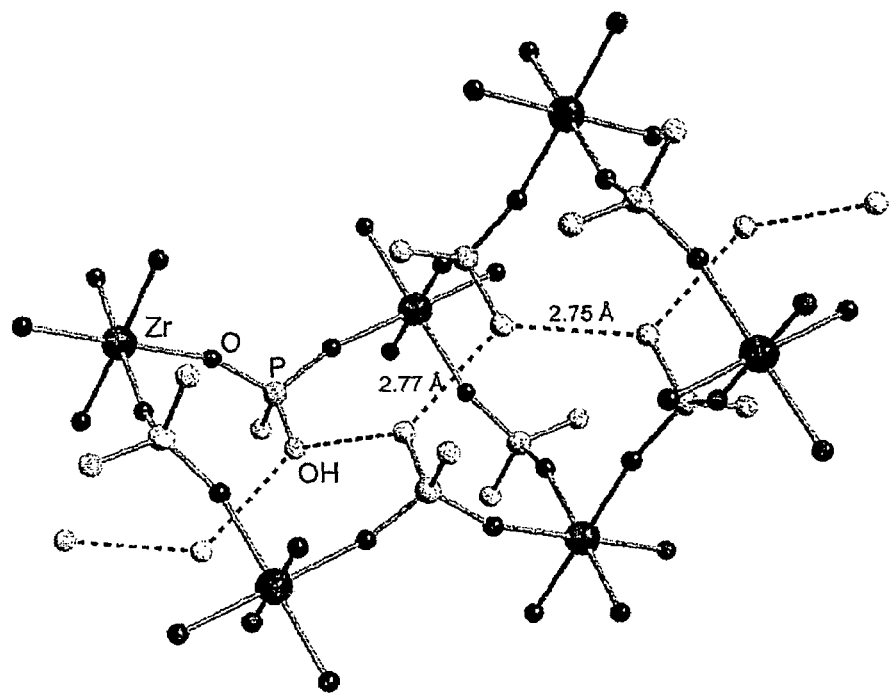
Figure 6:
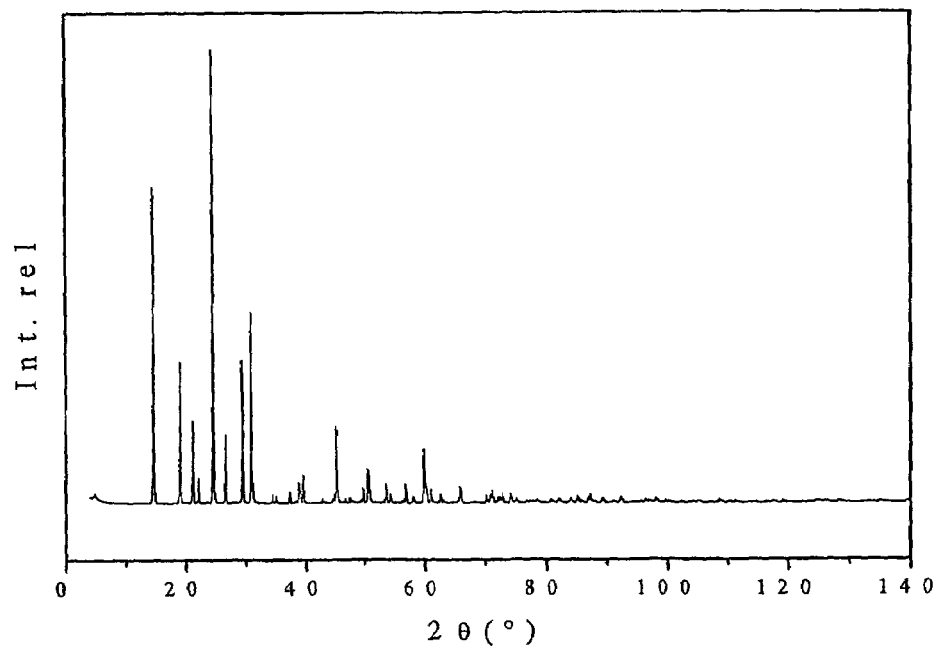
Figure 7:
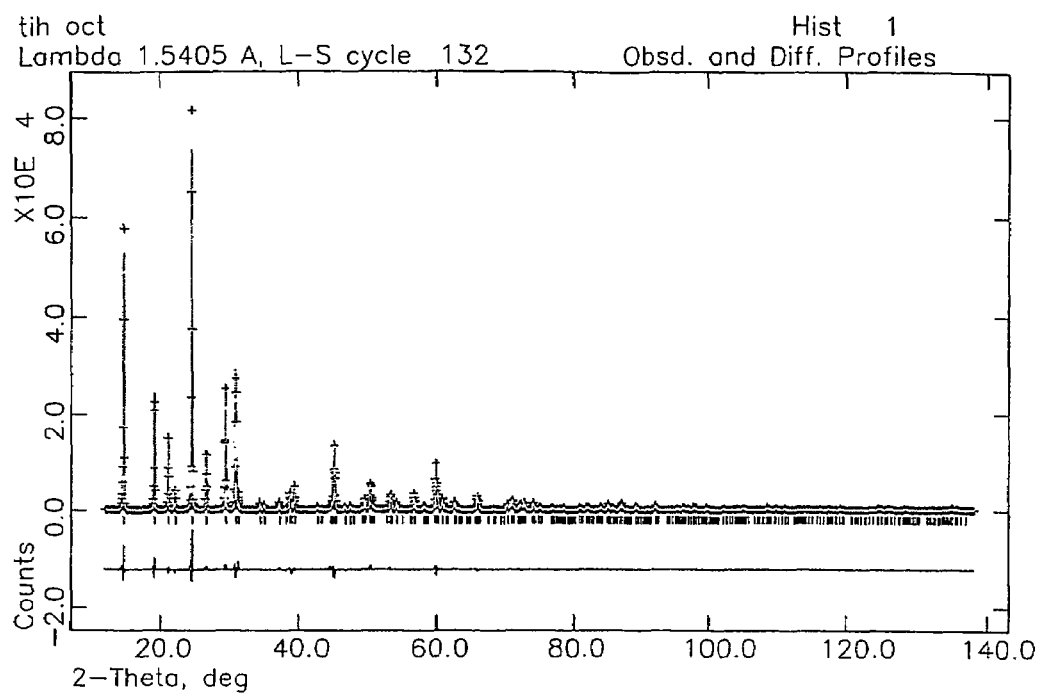
Figure 8:
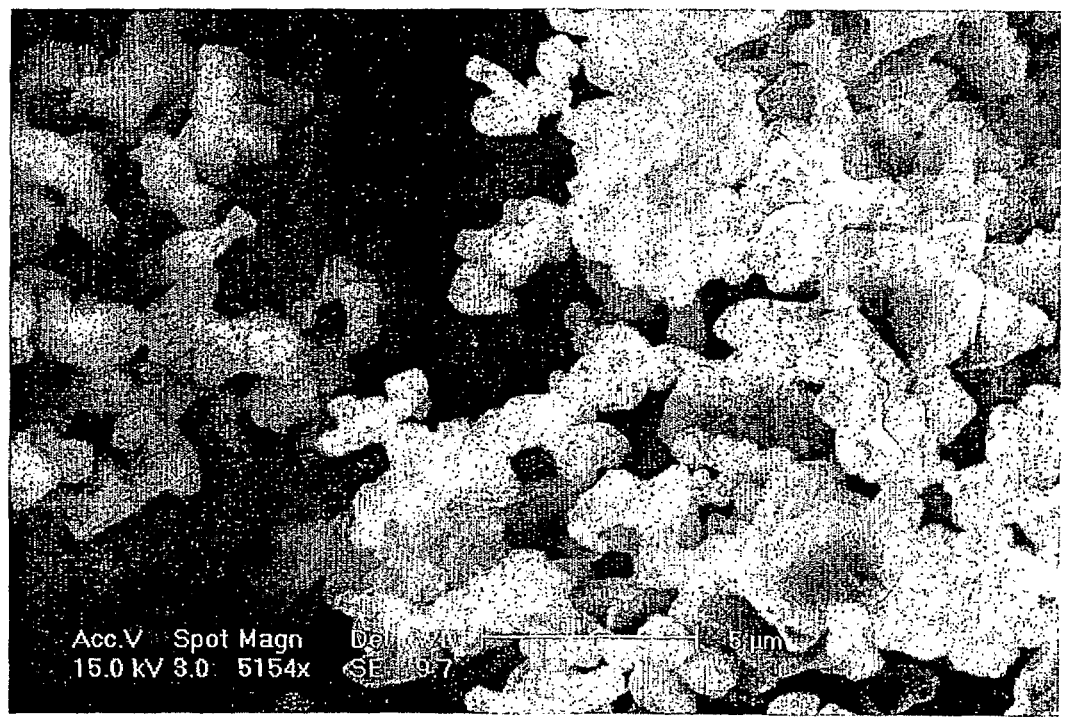

FIG. 4 shows Ball and stick representation of the structure of M(IV)(HPO$_4$)(H$_2$PO$_4$)$_2$ FIG. 5 shows a portion of the structure of Zr(HPO$_4$)(H$_2$PO$_4$)$_2$ in which the continuous H-bond path is represented as dashed lines FIG. 6 shows an X-ray powder pattern of Ti(HPO$_4$)(H$_2$PO$_4$)$_2$ FIG. 7 shows a Rietveld plot for Ti(HPO$_4$)(H$_2$PO$_4$)$_2$ FIG. 8 shows a SEM picture of Ti(HPO$_4$)(H$_2$PO$_4$)$_2$ micro crystals.

Figure 9:
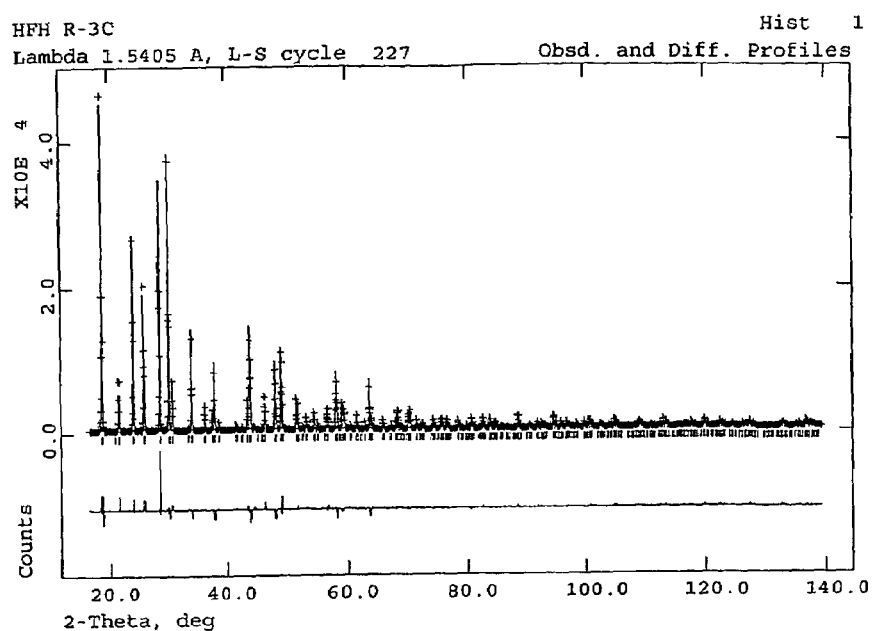

FIG. 9 shows Rietveld plot for Hf(HPO$_4$)(H$_2$PO$_4$)$_2$

Figure 10:
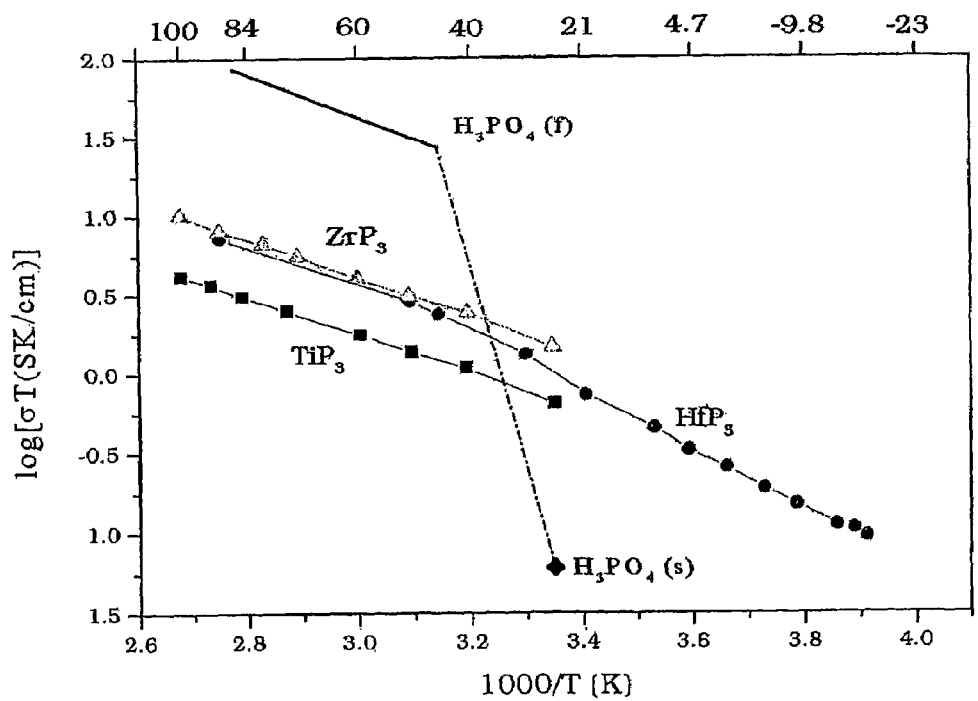
Figure 11:
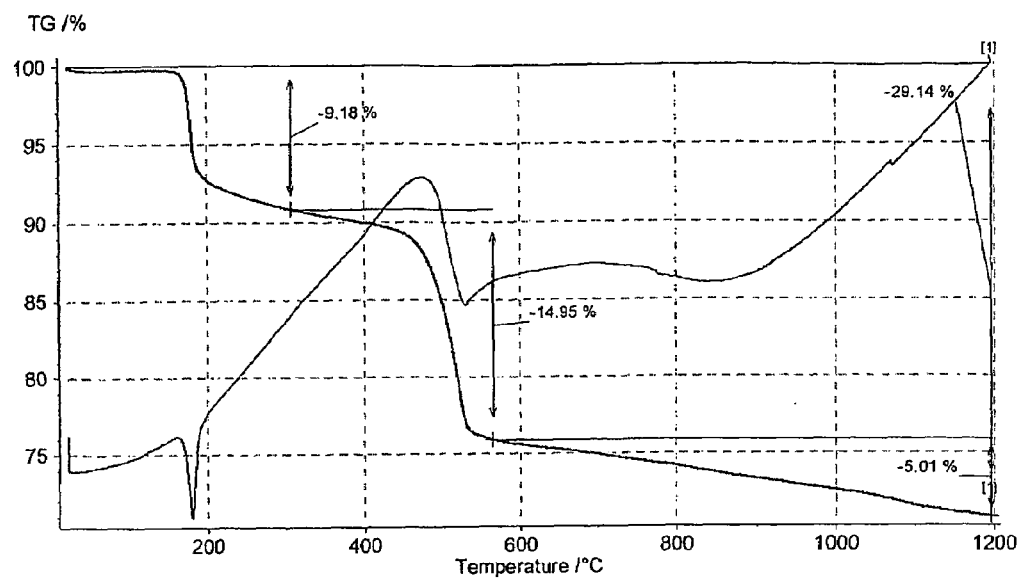
Figure 12:
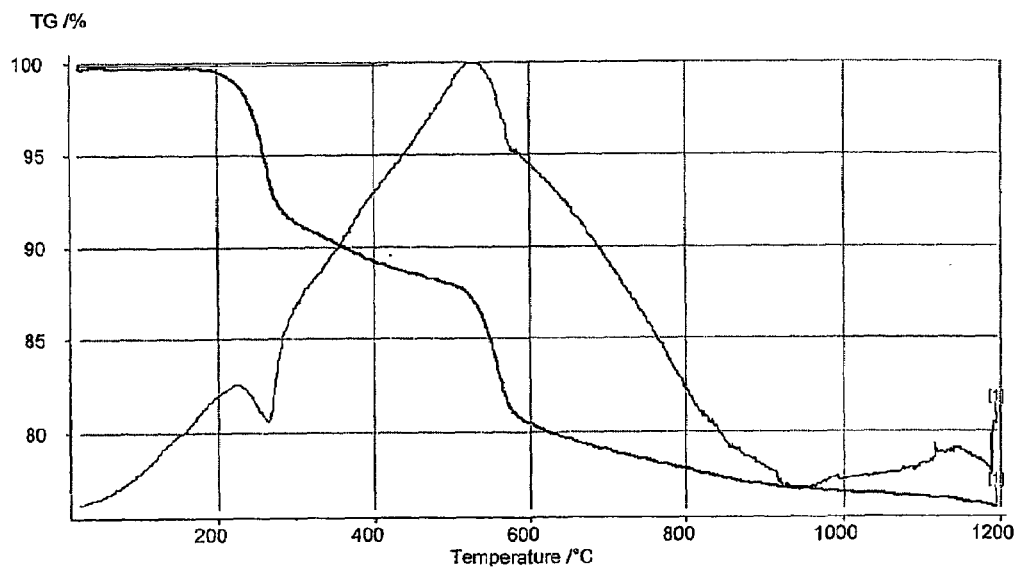
Figure 13:
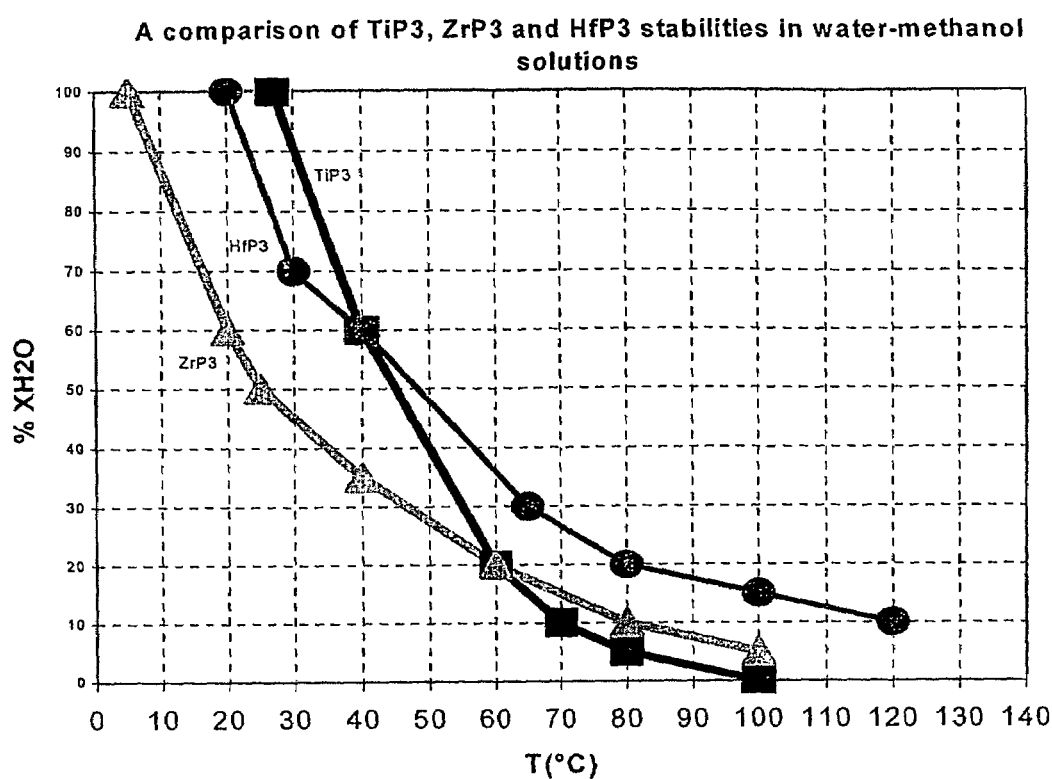

FIG. 10 shows the Arrhenius plot of Ti(HPO$_4$)(H$_2$PO$_4$)$_2$, Zr(HPO$_4$)(H$_2$PO$_4$)$_2$ and Hf(HPO$_4$)(H$_2$PO$_4$)$_2$ and melted and solid H$_3$PO$_4$ for reference FIG. 11 shows the thermo gravimetric-DTA curves for Zr(HPO$_4$)(H$_2$PO$_4$)$_2$ FIG. 12 shows the thermo gravimetric-DTA curves for Ti(HPO$_4$)(H$_2$PO$_4$)$_2$ FIG. 13 shows the stability curves of Ti(HPO$_4$)(H$_2$PO$_4$)$_2$, Zr(HPO$_4$)(H$_2$PO$_4$)$_2$ and Hf(HPO$_4$)(H$_2$PO$_4$)$_2$

DATA COLLECTION, STRUCTURE SOLUTION AND REFINEMENT FOR Zr(HPO$_4$)(H$_2$PO$_4$)$_2$, Ti(HPO$_4$)(H$_2$PO$_4$)$_2$ AND Hf(HPO$_4$)(H$_2$PO$_4$)$_2$

X-ray powder diffraction patterns for structure determination and Rietveld refinement were collected according to the step scanning procedure with CuKα radiation on a Philips X'PERT APD diffractometer, PW3020 goniometer equipped with a bent graphite monochromator on the diffracted beam. 0.5° divergence and scatter slits and a 0.1 mm receiving slit were used. The LFF ceramic tube operated at 40 KV, 30 mA. A first determination of cell parameters was made using the TREOR90 program (P. E. Werner, L. Eriksson and M. Westdhal, *J. Appl. Crystallogr.*, 1985, 18, 367). For this, a preliminary peak-profile fitting, using pseudo-Voigt functions for the determination of the position of Kα$_1$ maxima, was carried out. The analysis of the indexed patterns clearly revealed the presence of the following limiting reflection conditions: hkl, −h+k+l=3n which suggested a limited set of probable space groups. A systematic comparison of the number of peaks found and the number of possible peaks, in all trigonal and hexagonal space groups using the Chekcell program (J. Laugier and B. Bochu, *LMGP-Suite*, ENSP/Laboratoire des Matériaux et du Génie Physique, BP 46. 38042 Saint Martin d'Hères, France) estimated R-3c as the best choice, for all structures.

The structures were solved by direct methods with the EXPO program (A. Altomare, M. C. Burla, G. Cascarano, C. Giacovazzo, A. Guagliardi, A. G. G. Moliterni and G. Polidori, *J. Appl. Crystallogr.*, 1995, 28, 842.) and were then refined with the GSAS program (A. Larson and R. B. Von Dreele, *GSAS, Generalized Structure Analysis System*, Los Alamos National Laboratory, 1988). All the atoms were refined isotropically and neutral atomic scattering factors were used. The shape of the profile was modelled by a pseudo-Voigt function in which a parameter for asymmetry at low angle was included. No correction was made for absorption. At the end of the refinement, the shifts in all parameters were less than their standard deviations.

Proton Conductivity

The measurements have been performed by impedance spectroscopy in the frequency range 10 Hz-10 MHz at a signal amplitude <100 mV. The Schlumberger 1260 Impedance/Gain Phase Analyser was used. The impedance data were corrected for the contribution of the empty and shortcircuited cell. The pellet resistance was obtained by extrapolating the impedance data to the real axis on the high frequency side.

Pellets, 10 mm in diameter and 1.5 to 1.7 mm thick, were prepared by pressing about 200 mg of material at 40 kN/cm$^2$. The two flat surfaces of the pellets were coated by a composite electrode consisting of a mixture of platinum black (Ventron) with the material in the ratio 3:1.

A sealed-off cell, in which nitrogen can be fluxed, was used. In the temperature range −23 to 80° C. pure nitrogen (relative humidity lower than 1%) was fluxed. In the temperature range 80 to 100° C. nitrogen was first bubbled in water maintained with a thermostat at the suitable temperature between 1 to 7° C. in order to have a relative humidity of fluxed nitrogen of about 1% (this low humidity is necessary to avoid condensation of the acid M(VI) acid triphosphates to pyrophosphates).

FIG. 10 shows the Arrhenius plot of Ti(HPO$_4$)(H$_2$PO$_4$)$_2$ and Zr(HPO$_4$)(H$_2$PO$_4$)$_2$ in the temperature range 20 to 100° C. In the same FIG. 10 is also reported the plot of Hf(HPO$_4$)(H$_2$PO$_4$)$_2$ determined in a larger range of temperature (from −23° C. to 100° C.). As a comparison, the literature data for molten and solid phosphoric acid are also reported. The activation energy for the conduction process in the temperature range 40 to 100° C. (obtained by the equation σT=Log·A−E$_a$/2.3RT) is similar for all three materials (about 5.6 Kcal/mol).

Thermo Gravimetric Analysis

Thermo gravimetric (TG) and thermal differential analyses were performed with NETZSCH 449C Thermoanalyser.

a) Zr(HPO$_4$)(H$_2$PO$_4$)$_2$

Zr(HPO$_4$)(H$_2$PO$_4$)$_2$ weight loss starts at about 180° C., with the loss of about 2.5 moles of water per mol of Zr, and the formation of cubic Zr pyrophosphate, according with the following reaction:

A second loss, due to residual water and P$_2$O$_5$ sublimation starts at about 450° C., and slowly continues up to 1200° C. At the end of the analysis only TiP$_2$O$_7$ is present. The total weight loss is 29.14% (calculated: 30.43%). The FIG. 11 shows the thermo gravimetric-DTA curves for Zr(HPO$_4$)(H$_2$PO$_4$)$_2$. Heating rate: 1° C./min. Air flow, 30 ml/min.

b) Ti(HPO$_4$)(H$_2$PO$_4$)$_2$

Ti(HPO$_4$)(H$_2$PO$_4$)$_2$ weight loss starts at about 200° C., with the loss of about 2.5 moles of water per mol of Ti, and the formation of Ti pyrophosphate, according with the following reaction:

A second loss, due to residual water and P$_2$O$_5$ sublimation starts at about 500° C., and slowly continues up to 1200° C. At the end of the analysis only ZrP$_2$O$_7$ is present. However, it is known that titanium pyrophosphate starts to decompose over 1000° C. For this, the stoichiometry of the sample at the end of the analysis is unknown. FIG. 12 shows the thermo gravimetric-DTA curves for Ti(HPO$_4$)(H$_2$PO$_4$)$_2$. Heating rate: 1° C./min. Air flow, 30 ml/min.

Stability of M(IV)(HPO$_4$)(H$_2$PO$_4$)$_2$ Compounds

M(IV)(HPO$_4$)(H$_2$PO$_4$)$_2$ compounds are stable, under anhydrous conditions, up to about 100° C. At higher temperature, the transformation into cubic zirconium pyrophosphate, according to reaction: M(IV)(HPO$_4$)(H$_2$PO$_4$)$_2$→M(IV)P$_2$O$_7$+H$_3$PO$_4$+H$_2$O, takes place.

In presence of water, the release of phosphoric acid takes place at temperature lower than 100° C., with formation of the α-layered structure, according to the reaction:

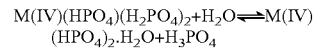

It was found that this reaction is reversible.

It was of interest to see the stability of M(IV)(HPO$_4$)(H$_2$PO$_4$)$_2$ compounds in methanol-water mixtures.

This stability was determined by dipping about 200 mg of sample in 10 ml of methanol-water at different fraction molar compositions and temperature. After 7 days of contact, the samples were separated by centrifugation and X-ray were taken. The sample was considered stable when its X-ray pattern was not changed and no peaks of other phases were present after this contact. Note that in all cases where instability was found, only the α-layered structure was formed under 100° C. Above 100° C., the cubic pyrophosphate M(IV)P$_2$O$_7$ was indeed found.

FIG. 13 shows the stability curves of Ti(HPO$_4$)(H$_2$PO$_4$)$_2$, Zr(HPO$_4$)(H$_2$PO$_4$)$_2$ and Hf(HPO$_4$)(H$_2$PO$_4$)$_2$ (labelled as TiP3, ZrP3 and HfP3 respectively) compounds. The compounds can be considered stables, under the given experimental conditions, in all (T, X$_{H2O}$) points under the curve and instable above the curve.

The invention claimed is:

1. A metal acid phosphate composition of the general formula M(IV)(HPO$_4$)(H$_2$PO$_4$)$_2$ where M is a tetravalent metal or a mixture of tetravalent metals, and
   wherein the M(IV) atoms are octahedrally coordinated with oxygen atoms of acid phosphate groups.

2. The composition according to claim 1, wherein the composition has a protonic conductivity of at least 0.001 S/cm surroundings substantially free from water.

3. The composition according to claim 1, wherein M is at least one metal of the fourth group of transition metals.

4. The composition according to claim 1, wherein the composition has a three-dimensional trigonal structure.

5. The composition according to claim 1, wherein an inter phosphate O—O distance of adjacent phosphate groups is below 3.0 Å.

6. The composition according to claim 1, wherein the composition is stable in air up to about 100° C. or more and at a water vapour partial pressure below 7 mm Hg.

7. The composition according to claim 1, wherein the composition is protonconductable in a polymer nonprotonconductable in a state free from water.

8. The composition according to claim 1, wherein the composition has a microcrystalline structure.

9. The composition according to claim 8, wherein the composition has a crystal size of below 20 μm.

10. The composition according to claim 1, wherein the composition has the form of a thin film.

11. The composition according to claim 1, wherein the composition has the form of a membrane.

12. The composition according to claim 1, wherein the composition has the form of a tablet.

13. The composition according to claim 1, wherein the composition is embedded in a polymer membrane.

14. A method for preparation of compositions of the general structure M(IV)(HPO$_4$)(H$_2$PO$_4$)$_2$ according to claim 1 based on the following steps:
   a) treating a metal M(IV) containing material in anhydrous phosphoric acid
   b) incubating the material at a temperature of 70-100° C.,
   c) separating a M(IV)(HPO$_4$)(H$_2$PO$_4$)$_2$ containing material from the phosphoric acid.

15. The method according to claim 14 wherein the metal M(IV) containing material is a metal M(IV) containing compound.

16. The method according to claim 14 wherein the metal M(IV) containing material is a membrane containing a metal M(IV) compound.

17. The method according to claims 14, wherein the anhydrous phosphoric acid is a solution of phosphoric acid, prepared by dissolving anhydrous phosphoric acid in an anhydrous organic solvent.

18. A composite membrane made of organic polymers and at least one tetravalent metal acid triphosphate [M(IV)(HPO$_4$)(H$_2$PO$_4$)$_2$] according to claim 1.

19. A composite membrane made of a porous membrane wherein pores are filled with at least one tetravalent metal acid triphosphate according to claim 1.

20. A protonic conduction separator membrane containing at least one tetravalent metal acid triphosphate according to claim 1.

21. A thin layer containing at least one crystallized tetravalent metal acid triphosphate according to claim 1.

22. A catalyst powder containing at least one tetravalent metal acid triphosphate according to claim 1.

23. A super capacitor with two conductors separated by a dielectric, wherein the dielectric contains at least one tetravalent metal acid triphosphate according to claim 1.

24. A fuel cell containing at least two porous electrodes and a proton conducting thin layer comprising at least one tetravalent metal acid triphosphate according to claim 1.

25. A fuel cell containing at least two electrodes and a proton conducting membrane according to claim 18.

26. A protonic pump with an anode, a cathode and a proton conductive separator containing at least one tetravalent metal acid triphosphate according to claim 1.

* * * * *